United States Patent
Kasahara

(10) Patent No.: US 11,173,915 B2
(45) Date of Patent: Nov. 16, 2021

(54) HYBRID VEHICLE DRIVE APPARATUS

(71) Applicant: Honda Motor Co., Ltd., Tokyo (JP)

(72) Inventor: Takahiro Kasahara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 22 days.

(21) Appl. No.: 15/931,587

(22) Filed: May 14, 2020

(65) Prior Publication Data

US 2020/0369142 A1 Nov. 26, 2020

(30) Foreign Application Priority Data

May 23, 2019 (JP) .............................. JP2019-096780

(51) Int. Cl.
| | |
|---|---|
| *B60W 10/06* | (2006.01) |
| *B60W 10/08* | (2006.01) |
| *B60K 6/445* | (2007.10) |
| *B60W 30/184* | (2012.01) |
| *B60W 20/40* | (2016.01) |
| *B60K 6/383* | (2007.10) |
| *B60K 6/365* | (2007.10) |

(Continued)

(52) U.S. Cl.
CPC ......... *B60W 30/1843* (2013.01); *B60K 6/365* (2013.01); *B60K 6/383* (2013.01); *B60K 6/445* (2013.01); *B60K 6/547* (2013.01); *B60W 10/06* (2013.01); *B60W 10/08* (2013.01); *B60W 10/115* (2013.01); *B60W 20/40* (2013.01); *B60W 2510/0638* (2013.01); *B60W 2510/081* (2013.01); *B60W 2710/1005* (2013.01)

(58) Field of Classification Search
CPC ......... B60W 10/02–023; B60W 10/06; B60W 10/08; B60W 10/115; B60W 20/40; B60W 2710/1005; B60W 2510/0638; B60K 6/445; B60K 6/365; B60K 6/547
See application file for complete search history.

(56) References Cited

U.S. PATENT DOCUMENTS

| | | | |
|---|---|---|---|
| 2002/0117860 A1* | 8/2002 | Man ...................... | B60W 10/02 290/46 |
| 2003/0104900 A1* | 6/2003 | Takahashi ............. | B60W 20/30 477/3 |

(Continued)

FOREIGN PATENT DOCUMENTS

| | | | | |
|---|---|---|---|---|
| JP | 2004278367 A | * | 10/2004 | ............. F16H 3/725 |
| JP | 6015410 B2 | | 10/2016 | |

*Primary Examiner* — David R Morris
(74) *Attorney, Agent, or Firm* — Duft & Bornsen, PC

(57) ABSTRACT

A drive apparatus of a hybrid vehicle including a first and second rotors arranged movably in axial direction so as to separate from or approach each other, and a microprocessor. The microprocessor is configured to perform selecting a drive mode from among drive modes including a first mode in which the engine drives a planetary gear mechanism, a second mode in which the engine is stopped, and a third mode in which the engine is driven through the planetary gear mechanism, and controlling a first motor-generator and a clutch mechanism so that the first motor-generator generates regenerative energy when the drive mode is switched from the first mode to the second mode, and then so that the clutch mechanism is engaged and the first motor-generator generates drive torque when the drive mode is switched to the third mode.

9 Claims, 13 Drawing Sheets

(51) Int. Cl.
*B60K 6/547* (2007.10)
*B60W 10/115* (2012.01)

(56) References Cited

U.S. PATENT DOCUMENTS

2009/0082151 A1\* 3/2009 Tabata ..................... B60K 6/40
 475/5
2019/0276006 A1\* 9/2019 Kasahara ............... B60K 6/383
2019/0329642 A1\* 10/2019 Hori ...................... F16H 57/037

\* cited by examiner

FIG. 2

|  |  | BR | CL | OWY | ENG |
|---|---|---|---|---|---|
| EV MODE | | × | × | × | × |
| W MOTOR MODE | | × | ○ | ○ | × |
| SERIES MODE | | ○ | ○ | × | ○ |
| HV MODE | LOW | × | ○ | ○ | ○ |
| | HIGH | ○ | × | ○ | ○ |

EV MODE

W MOTOR MODE

SERIES MODE

HV LOW MODE

HV HIGH MODE

HV LOW MODE

EV MODE

START MODE

REGENERATION OR EV MODE

REGENERATION OR EV MODE

REGENERATION OR EV MODE

REGENERATION OR EV MODE

HYBRID VEHICLE DRIVE APPARATUS

CROSS-REFERENCE TO RELATED APPLICATION

This application is based upon and claims the benefit of priority from Japanese Patent Application No. 2019-096780 filed on May 23, 2019, the content of which is incorporated herein by reference.

BACKGROUND OF THE INVENTION

Field of the Invention

This invention relates to a drive apparatus of a hybrid vehicle.

Description of the Related Art

Conventionally, there is a known apparatus that includes an engine and a first and second motor-generators so that torque output from the engine is divided and transmitted to the first motor-generator and an output shaft through a planetary gear mechanism and a hybrid vehicle is made to travel by torque of the output shaft and torque of the second motor-generator. Such an apparatus is described, for example, in Japanese Patent Publication No. 6015410 (JP6015410B). The apparatus described in JP6015410B includes a clutch and brake connected to the planetary gear mechanism, switches a drive mode to one of a HV mode driven by power of the engine and the second motor-generator, an EV mode driven by power of the second motor-generator after the engine is stopped from the HV mode, and a start mode in which the engine is restarted from the EV mode, etc.

In the apparatus in JP6015410B, the engine drives in the HV mode, while the engine is driven in the start mode. Therefore, when the planetary gear mechanism is configured by helical gears, a direction of an axial torque acting through the planetary gear mechanism in the HV mode is different from a direction of an axial torque acting through the planetary gear mechanism in the start mode. As a result, in the start mode, rotational members arranged adjacently in the axial direction contact, and may generate heat by frictional sliding.

SUMMARY OF THE INVENTION

An aspect of the present invention is a drive apparatus of a hybrid vehicle including: an internal combustion engine; a first motor-generator; a planetary gear mechanism including helical gears and connected to the internal combustion engine and the first motor-generator; a first rotor to which a torque output from the planetary gear mechanism is input; a second rotor arranged rotatably relative to the first motor and adjacent to the first rotor in an axial direction; a clutch mechanism configured to integrally engage or disengage the first rotor and the second rotor; a component configured to generate a power transmission path transmitting a torque output from the second rotor to a drive wheel; a second motor-generator connected to the power transmission path; and an electronic control unit including a microprocessor configured to perform selecting a drive mode from among a plurality of drive modes and controlling the internal combustion engine, the first motor-generator, the second motor-generator, and the clutch mechanism in accordance with the drive mode. The plurality of drive modes include a first mode in which the internal combustion engine drives the planetary gear mechanism, a second mode in which the internal combustion engine is stopped, and a third mode in which the internal combustion engine is driven through the planetary gear mechanism, the first rotor is arranged movably in the axial direction so as to separate from the second rotor by a first load acting through the planetary gear mechanism toward a first direction in the axial direction when the internal combustion engine drives and so as to approach the second rotor by a second load acting through the planetary gear toward a second direction opposite to the first direction when the internal combustion engine is driven, and the microprocessor is configured to perform the controlling including controlling the first motor-generator and the clutch mechanism so that the first motor-generator generates a regenerative energy when the drive mode is switched from the first mode to the second mode, and then so that the clutch mechanism is engaged and the first motor-generator generates a drive torque when the drive mode is switched to the third mode.

BRIEF DESCRIPTION OF THE DRAWINGS

The objects, features, and advantages of the present invention will become clearer from the following description of embodiments in relation to the attached drawings, in which:

FIG. 2 is a diagram an example of drive modes implemented by the drive apparatus of the hybrid vehicle according to the embodiment of the invention;

DETAILED DESCRIPTION OF THE INVENTION

Figure 1:
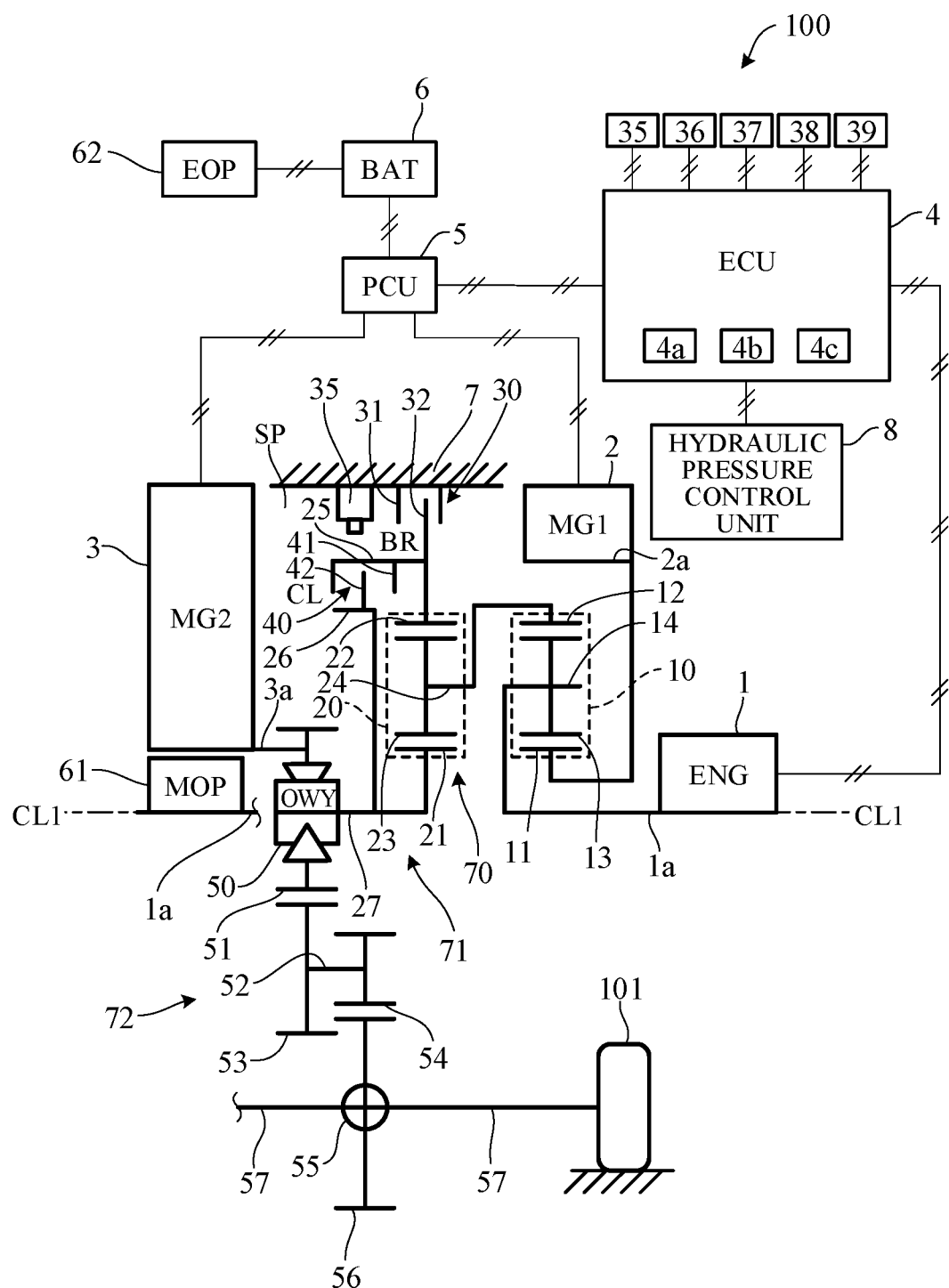
FIG. 1 is a diagram showing schematically a configuration overview of a drive apparatus of a hybrid vehicle according to an embodiment of the invention.

Hereinafter, an embodiment of the present invention is explained with reference to FIGS. 1 to 12B. A drive apparatus according to an embodiment of the present invention is applied to a hybrid vehicle including an engine and a motor-generator as a drive power source. FIG. 1 is a diagram showing schematically a configuration overview of a drive apparatus 100 according to the present embodiment.

As shown in FIG. 1, the drive apparatus (drive unit) 100 includes an engine (ENG) 1, first and second motor-generators (MG1 and MG2) 2 and 3, a first planetary gear mechanism 10 for dividing motive power, and a second planetary gear mechanism 20 for changing speed ratio. The drive apparatus 100 is mounted at front of a vehicle, and motive power of the drive apparatus 100 is transmitted to front wheels 101.

The engine 1 is an internal combustion engine (e.g., gasoline engine) wherein intake air supplied through a throttle valve and fuel injected from an injector are mixed at an appropriate ratio and thereafter ignited by a sparkplug or the like to burn explosively and thereby generate rotational power. A diesel engine or any of various other types of engine can be used instead of a gasoline engine. Throttle valve opening, quantity of fuel injected from the injector (injection time and injection time period) and ignition time are, inter alia, controlled by a controller (ECU) 4. An output shaft 1a of the engine 1 extends centered on axis CL1, and rotates around the axis CL1. The engine 1 includes a one-way clutch so as to prevent the engine 1 from reversely rotating.

The first and second motor-generators 2 and 3 each has a substantially cylindrical rotor centered on axis CL1 and a substantially cylindrical stator installed around the rotor and can function as a motor and as a generator. Namely, the rotors of the first and second motor-generators 2 and 3 are driven to rotate around the axis CL1 by electric power supplied from a battery 6 through a power control unit (PCU) 5 to coils of the stators. In such case, the first and second motor-generators 2 and 3 function as motors.

On the other hand, when rotating shafts 2a and 3a of rotors of the first and second motor-generators 2 and 3 are driven by external forces, the first and second motor-generators 2 and 3 generate electric power that is applied through the power control unit 5 to charge the battery 6. In such case, the first and second motor-generators 2 and 3 function as generators. During normal vehicle traveling, such as during cruising or acceleration, for example, the first motor-generator 2 functions chiefly as a generator and the second motor-generator 3 functions chiefly as a motor.

The power control unit 5 incorporates an inverter controlled by instructions from the controller 4 so as to individually control output torque or regenerative torque of the first motor-generator 2 and the second motor-generator 3.

The first motor-generator 2 and the second motor-generator 3 are coaxially installed at spaced locations. The first motor-generator 2 and second motor-generator 3 are, for example, housed in a common case 7, and a space SP between them is enclosed by the case 7. Optionally, the first motor-generator 2 and second motor-generator 3 can be housed in separate cases.

The first planetary gear mechanism 10 and second planetary gear mechanism 20 are installed in the space SP between the first motor-generator 2 and second motor-generator 3. Specifically, the first planetary gear mechanism 10 is situated on the side of the first motor-generator 2 and the second planetary gear mechanism 20 on the side of the second motor-generator 3.

The first planetary gear mechanism 10 includes a first sun gear 11 and a first ring gear 12 installed around the first sun gear 11, both of which rotate around axis CL1, multiple circumferentially spaced first pinions (planetary gears) 13 installed between the first sun gear 11 and first ring gear 12 to mesh with these gears 11 and 12, and a first carrier 14 that supports the first pinions 13 to be individually rotatable around their own axes and collectively revolvable around axis CL1. The gears 11 to 13 of the first planetary gear mechanism 10 are configured by helical gears, respectively.

Similarly to the first planetary gear mechanism 10, the second planetary gear mechanism 20 includes a second sun gear 21 and a second ring gear 22 installed around the second sun gear 21, both of which rotate around axis CL1, multiple circumferentially spaced second pinions (planetary gears) 23 installed between the second sun gear 21 and second ring gear 22 to mesh with these gears 21 and 22, and a second carrier 24 that supports the second pinions 23 to be individually rotatable around their own axes and collectively revolvable around axis CL1. The gears 21 to 23 of the second planetary gear mechanism 20 are configured by helical gears, respectively.

The output shaft 1a of the engine 1 is connected to the first carrier 14, and power of the engine 1 is input to the first planetary gear mechanism 10 through the first carrier 14. On the other hand, when the engine 1 is started, power from the first motor-generator 2 is input to the engine 1 through the first planetary gear mechanism 10. The first sun gear 11 is connected to the rotating shaft 2a of the rotor of the first motor-generator 2, and the first sun gear 11 and first motor-generator 2 (rotor) rotate integrally. The first ring gear 12 is connected to the second carrier 24, and the first ring gear 12 and second carrier 24 rotate integrally.

Owing to this configuration, the first planetary gear mechanism 10 can output power received from the first carrier 14 through the first sun gear 11 to the first motor-generator 2 and output power through the first ring gear 12 to the second carrier 24 on an axle (drive shaft) 57 side. In other words, it can dividedly output power from the engine 1 to the first motor-generator 2 and the second planetary gear mechanism 20.

An axis CL1-centered substantially cylindrical outer drum 25 is provided radially outside the second ring gear 22. The second ring gear 22 is connected to and rotates integrally with the outer drum 25. A brake mechanism 30 is provided radially outward of the outer drum 25. The brake mechanism 30 is, for example, structured as a multi-plate wet brake including multiple radially extending plates (friction members) 31 arranged in axial direction and multiple radially extending disks (friction members) 32 arranged in axial direction (multiple illustration is omitted in the drawing). The plates 31 and disks 32 are alternately arranged in axial direction.

The multiple plates 31 are circumferentially non-rotatably and axially movably engaged at their radial outer ends with the inner peripheral surface of the surrounding wall of the case 7. The multiple disks 32 rotate integrally with the outer drum 25 owing to their radially inner ends being engaged with outer peripheral surface of the outer drum 25 to be circumferentially non-rotatable and axially movable relative to the outer drum 25. A non-contact rotational speed sensor 35 for detecting rotational speed of the outer drum 25 is provided on inner peripheral surface of the case 7 to face outer peripheral surface of the outer drum 25 axially sideward of the brake mechanism 30.

The brake mechanism 30 includes a spring (not shown) for applying biasing force acting to separate the plates 31 and disks 32 and thus release the disks 32 from the plates 31, and a piston (not shown) for applying pushing force acting against the biasing force of the spring to engage the plates 31 and disks 32. The piston is driven by hydraulic pressure supplied through a hydraulic pressure control unit 8. In other words, the brake mechanism 30 configures a hydraulic actuator operated by hydraulic pressure.

In a state with no hydraulic pressure acting on the piston, the plates 31 and disks 32 separate, thereby releasing (turning OFF) the brake mechanism 30 and allowing rotation of the second ring gear 22. On the other hand, when hydraulic pressure acts on the piston, the plates 31 and disks 32 engage, thereby operating (turning ON) the brake mechanism 30. In this state, rotation of the second ring gear 22 is prevented.

An axis CL1-centered substantially cylindrical inner drum 26 is provided radially inward of and facing the outer drum 25. The second sun gear 21 is connected to an output shaft 27 of a second planetary gear mechanism 20 that extends along axis CL1 and is connected to the inner drum 26, whereby the second sun gear 21, output shaft 27 and inner drum 26 rotate integrally. A clutch mechanism 40 is provided between the outer drum 25 and the inner drum 26.

The clutch mechanism 40 is, for example, structured as a multi-plate wet clutch including multiple radially extending plates (friction members) 41 arranged in axial direction and multiple radially extending disks (friction members) 42 arranged in axial direction (multiple illustration is omitted in the drawing). The plates 41 and disks 42 are alternately arranged in axial direction. The multiple plates 41 rotate integrally with the outer drum 25 owing to their radial outer ends being engaged with the inner peripheral surface of the outer drum 25 to be circumferentially non-rotatable and axially movable relative to the outer drum 25. The multiple disks 42 rotate integrally with the inner drum 26 owing to their radially inner ends being engaged with outer peripheral surface of the inner drum 26 to be circumferentially non-rotatable and axially movable relative to the inner drum 26.

The clutch mechanism 40 includes a spring (not shown) for applying biasing force acting to separate the plates 41 and disks 42 and thus release the disks 42 from the plates 41, and a piston (not shown) for applying pushing force acting against the biasing force of the spring to engage the plates 41 and disks 42. The piston is driven by hydraulic pressure supplied through the hydraulic pressure control unit 8. In other words, the clutch mechanism 40 configures a hydraulic actuator operated by hydraulic pressure.

In a state with no hydraulic pressure acting on the piston, the plates 41 and disks 42 separate, thereby releasing (turning OFF) the clutch mechanism 40 and allowing relative rotation of the second sun gear 21 with respect to the second ring gear 22. When rotation of the second ring gear 22 is prevented by the brake mechanism 30 being ON at this time, rotation of the output shaft 27 with respect to the second carrier 24 is accelerated. This state corresponds to speed ratio stage being shifted to high.

On the other hand, when hydraulic pressure acts on the piston, the plates 41 and disks 42 engage, thereby operating (turning ON) the clutch mechanism 40 and integrally joining the second sun gear 21 and second ring gear 22. When rotation of the second ring gear 22 is allowed by the brake mechanism 30 being OFF at this time, the output shaft 27 becomes integral with the second carrier 24 and rotates at the same speed as the second carrier 24. This state corresponds to speed ratio stage being shifted to low.

The second planetary gear mechanism 20, brake mechanism 30 and clutch mechanism 40 configure a speed change mechanism 70 that shifts rotation of the second carrier 24 between two speed stages (high and low) and outputs the shifted rotation from the output shaft 27. Torque transmission path from the first planetary gear mechanism 10 to the output shaft 27 of upstream of the one-way clutch 50 through the speed change mechanism 70 configures a first power transmission path 71.

The output shaft 27 is connected through a one-way clutch (OWY) 50 to an output gear 51 centered on axis CL1. The one-way clutch 50 allows forward rotation of the output gear 51 with respect to the output shaft 27, i.e., relative rotation corresponding to vehicle forward direction, and prohibits rotation corresponding to vehicle reverse direction. In other words, when rotational speed of the output shaft 27 corresponding to vehicle forward direction is faster than rotational speed of the output gear 51, the one-way clutch 50 locks, whereby the output shaft 27 and output gear 51 rotate integrally. On the other hand, when rotational speed of the output gear 51 corresponding to vehicle forward direction is faster than rotational speed of the output shaft 27, the one-way clutch 50 disengages (unlocks), whereby the output gear 51 freely rotates with respect to the output shaft 27 without torque pulled back.

A rotating shaft 3a of the rotor of the second motor-generator 3 is connected to the output gear 51, so that the output gear 51 and the second motor-generator 3 (rotating shaft 3a) rotate integrally. Since the one-way clutch 50 is interposed between the output shaft 27 and the rotating shaft 3a, forward relative rotation of the rotating shaft 3a with respect to the output shaft 27 is allowed. In other words, when rotational speed of the second motor-generator 3 is faster than rotational speed of the output shaft 27, the second motor-generator 3 efficiently rotates without torque of the output shaft 27 (second planetary gear mechanism 20) pulled back. The one-way clutch 50 is installed radially inward of the rotating shaft 3a. Since axial length of the drive apparatus 100 can therefore be minimized, a smaller drive apparatus 100 can be realized.

An oil pump (MOP) 61 is installed radially inward of the rotor of the second motor-generator 3. The oil pump 61 is connected to the output shaft 1a of the engine 1 and driven by the engine 1. Therefore, when the engine speed is greater than or equal to a predetermined speed, hydraulic pressure (engaging pressure) necessary for engaging the brake mechanism 30 and the clutch mechanism 40 is obtained from the oil pump 61. In a case that the engine 1 stops or rotates at low speed, or the like, when it is necessary to engage the brake mechanism 30 or the clutch mechanism 40, oil supply necessary is covered by driving an electric pump (EOP) 62 with power from the battery 6.

A large-diameter gear 53 rotatable around a counter shaft 52 lying parallel to axis CL1 meshes with the output gear 51, and torque is transmitted to the counter shaft 52 through the large-diameter gear 53. Torque transmitted to the counter shaft 52 is transmitted through a small-diameter gear 54 to a ring gear 56 of a differential unit 55 and further transmitted through the differential unit 55 to the left and right axles (drive shaft) 57. Since this drives the front wheels 101, the vehicle travels. The rotating shaft 3a, output gear 51, large-diameter gear 53, small-diameter gear 54 and differential unit 55, inter alia, configure a second power transmission path 72 from the rotating shaft 3a to the axles 57. The first and second power transmission paths 71 and 72 are connected with each other in series.

The hydraulic pressure control unit 8 includes electromagnetic valve, proportional electromagnetic valve, and other control valves actuated in accordance with electric signals. These control valves operate to control hydraulic pressure flow to the brake mechanism 30, clutch mechanism 40 and the like in accordance with instructions from the controller 4. This enables ON-OFF switching of the brake mechanism 30 and clutch mechanism 40.

The controller (ECU) 4 as an electronic control unit incorporates an arithmetic processing unit having a CPU, ROM, RAM and other peripheral circuits, and the CPU includes an engine control ECU 4a, a hydraulic actuator control ECU 4b and a motor-generator control ECU 4c. Alternatively, the multiple ECUs 4a to 4c need not be incorporated in the single controller 4 but can instead be provided as multiple discrete controllers 4 corresponding to the ECUs 4a to 4c.

The controller 4 receives as input signals from, inter alia, the rotational speed sensor 35 for detecting rotational speed of the drum 25, a vehicle speed sensor 36 for detecting vehicle speed, an accelerator opening angle sensor 37 for detecting accelerator opening angle indicative of amount of accelerator pedal depression, a rotational speed sensor 38 for detecting rotational speed of the engine 1, and a rotational speed sensor for detecting rotational speed of the first motor-generator 2. Although not indicated in the drawings, the controller 4 also receives signals from a rotational speed sensor for detecting rotational speed of the second motor-generator 3, and a hydraulic pressure sensor for detecting hydraulic pressure applied to each hydraulic pressure (brake mechanism 30, clutch mechanism 40, etc.).

Based on these input signals, the controller 4 decides drive mode in accordance with a predefined driving force map representing vehicle driving force characteristics defined in terms of factors such as vehicle speed and accelerator opening angle. In order to enable the vehicle to travel in the decided drive mode, the controller 4 controls operation of the engine 1, first and second motor-generators 2 and 3, the brake mechanism 30 and the clutch mechanism 40 by outputting control signals to, inter alia, an actuator for regulating throttle valve opening, an injector for injecting fuel, the power control unit 5 and the hydraulic pressure control unit 8 (control valve).

FIG. 2 is a table showing examples of some drive modes that can be implemented by the drive apparatus 100 according to this embodiment of the present invention, along with operating states of the brake mechanism (BR) 30, clutch mechanism (CL) 40, one-way clutch (OWY) 50 and engine (ENG) 1 corresponding to the different modes.

In FIG. 2, EV mode, W motor mode, series mode and HV mode are shown as typical drive modes. HV mode is subdivided into low mode (HV low mode) and high mode (HV high mode). In the drawing, brake mechanism 30 ON (Engaged), clutch mechanism 40 ON (Engaged), one-way clutch 50 Locked, and engine 1 Operating are indicated by symbol "o", while brake mechanism 30 OFF (Disengaged), clutch mechanism 40 OFF (Disengaged), one-way clutch 50 Unlocked, and engine 1 Stopped are indicated by symbol "x".

Figure 3:
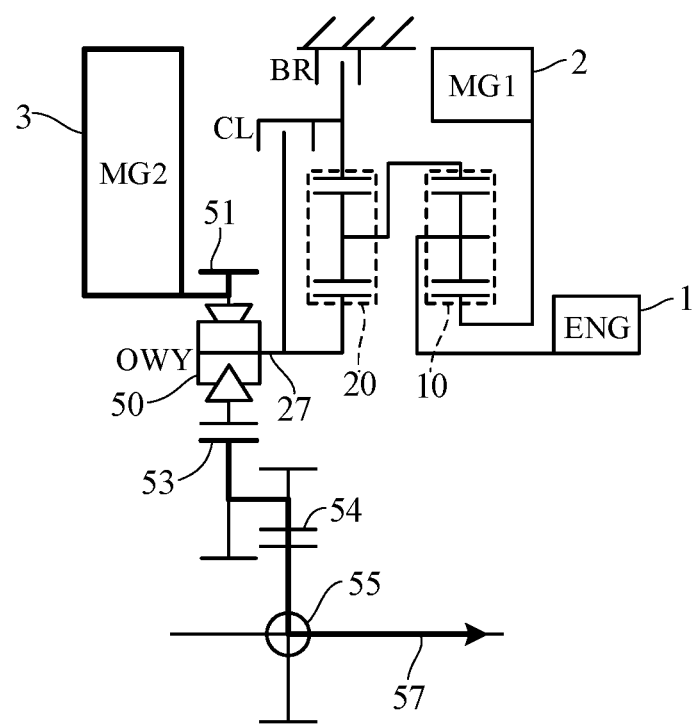
FIG. 3 is a skeleton diagram showing a flow of torque transmission in EV mode in the drive apparatus of FIG. 1.

In EV mode, the vehicle is driven for traveling solely by motive power of the second motor-generator 3. As shown in FIG. 2, in EV mode, the brake mechanism 30 and clutch mechanism 40 are both OFF, and the engine 1 is stopped, in accordance with instructions from the controller 4. FIG. 3 is a skeleton diagram showing flow of torque transmission in EV mode.

As show in FIG. 3, in EV mode, torque output from the second motor-generator 3 is transmitted through the output gear 51, large-diameter gear 53, small-diameter gear 54 and differential unit 55 to the axles 57. At this time, the output shaft 27 stays stopped under action of the one-way clutch 50 and efficient vehicle running can be achieved without torque pulled back (rotational resistance) attributable to rotating elements upstream of the second motor-generator 3 (on second planetary gear mechanism side) in the torque transmission path from the engine 1 to the wheel 101.

Figure 4:
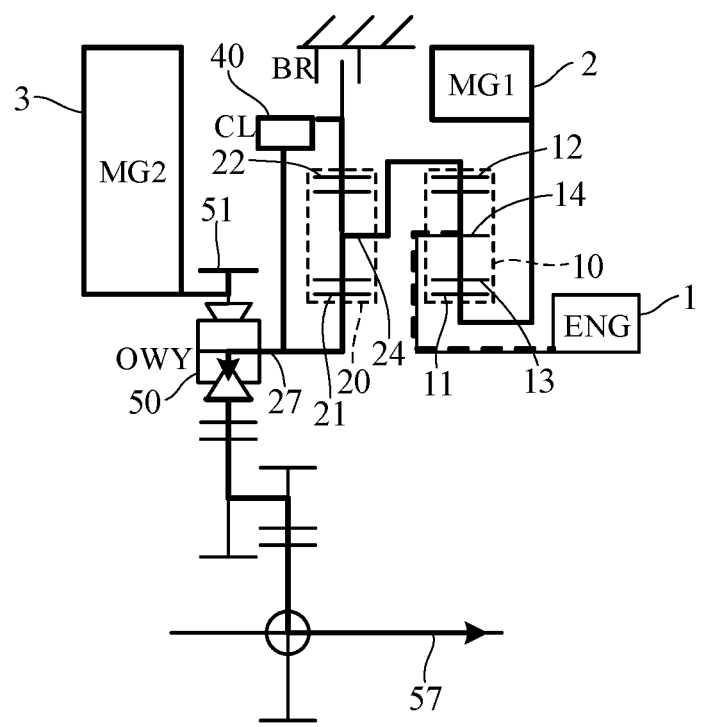
FIG. 4 is a skeleton diagram showing a flow of torque transmission in W motor mode in the drive apparatus of FIG. 1.

In W (double) motor mode, the vehicle is driven for traveling by motive power of the first motor-generator 2 and the second motor-generator 3. As shown in FIG. 2, in W motor mode, the brake mechanism 30 is OFF, the clutch mechanism 40 is ON and the engine 1 is stopped, in accordance with instructions from the controller 4. FIG. 4 is a skeleton diagram showing flow of torque transmission in W motor mode.

As show in FIG. 4, in W motor mode, reverse rotation of the output shaft 1a of the engine 1 is prevented by action of the one-way clutch 15, and torque output from the first motor-generator 2 is transmitted through the first sun gear 11, first pinions 13, first ring gear 12, second carrier 24 (second carrier 24 rotating integrally with the second sun gear 21 and second ring gear 22) to the output shaft 27. Torque transmitted to the output shaft 27 is transmitted through the locked one-way clutch 50 to the output gear 51, and transmitted to the axles 57 together with torque output from the second motor-generator 3. Since torque from the first motor-generator 2 and second motor-generator 3 is applied to the axles 57 in this manner in W motor mode, travel driving force can be increased to greater than in EV mode.

Figure 5:
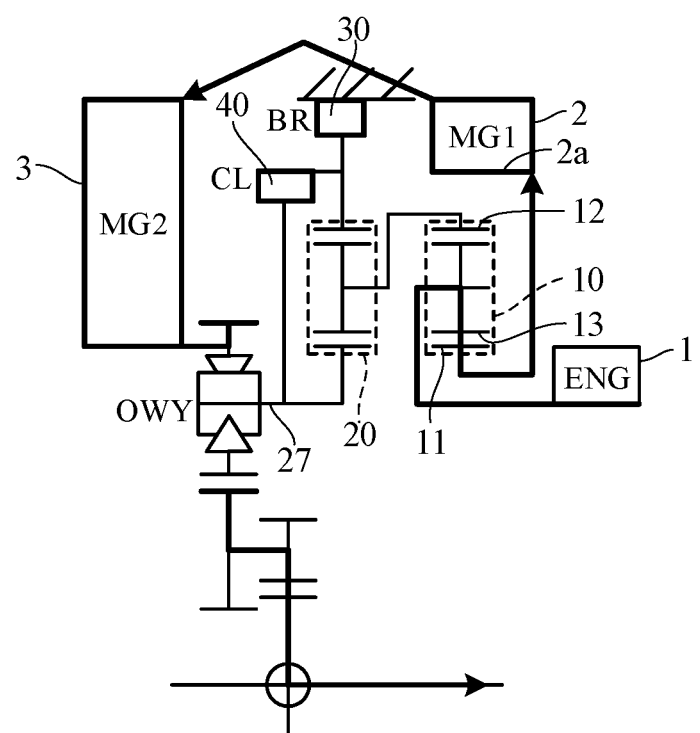
FIG. 5 is a skeleton diagram showing a flow of torque transmission in series mode in the drive apparatus of FIG. 1.

In series mode, the vehicle is driven for traveling by motive power of the second motor-generator 3 while the first motor-generator 2 is being driven by motive power from the engine 1 to generate electric power. As shown in FIG. 2, in series mode, the brake mechanism 30 and clutch mechanism 40 are both ON and the engine 1 is operated, in accordance with instructions from the controller 4. FIG. 5 is a skeleton diagram showing flow of torque transmission in series mode.

As shown in FIG. 5, in series mode, rotation from the first ring gear 12 to as far as the output shaft 27 is stopped, so that all power output from the engine 1 is input through the first pinions 13 and first sun gear 11 to the rotating shaft 2a of the first motor-generator 2. The first motor-generator 2 is therefore driven to generate electric power and this generated electric power is used to drive the second motor-generator 3, whereby the vehicle can travel. In other words, an electrical path is structured for supplying electrical energy generated by the first motor-generator 2 to the second motor-generator 3, whereby running of the vehicle is driven by the second motor-generator 3. In series mode, as in EV mode, pull back of torque is prevented by action of the one-way clutch 50. Amount of power supplied to the second motor-generator 3 through the electrical path is not greater than allowable output of the power control unit 5.

In HV mode, the vehicle is driven for traveling by motive power produced by the engine 1 and the second motor-generator 3. Within the HV mode, the HV low mode corresponds to a mode of wide-open acceleration from low speed, and the HV high mode corresponds to a mode of normal traveling after EV traveling. As shown in FIG. 2, in HV low mode, the brake mechanism 30 is OFF, the clutch mechanism 40 is ON and the engine 1 is operated, in accordance with instructions from the controller 4. In HV high mode, the brake mechanism 30 is ON, the clutch mechanism 40 is OFF and the engine 1 is operated, in accordance with instructions from the controller 4.

Figure 6:
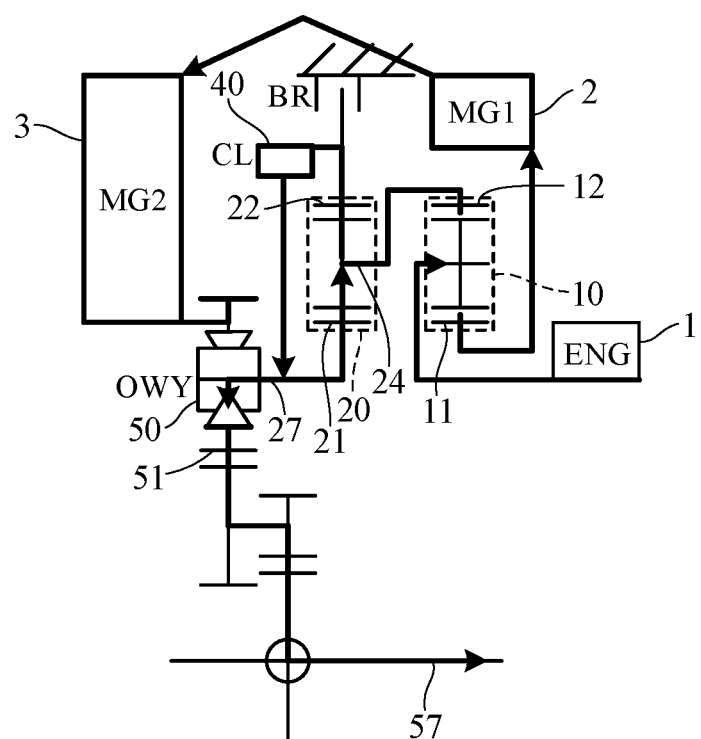
FIG. 6 is a skeleton diagram showing a flow of torque transmission in HV low mode in the drive apparatus of FIG. 1.

FIG. 6 is a skeleton diagram showing flow of torque transmission in HV low mode. As shown in FIG. 6, in HV low mode, some torque output from the engine 1 is transmitted through the first sun gear 11 to the first motor-generator 2. As a result, the battery 6 is charged by power generated by the first motor-generator 2, and, in addition, electrical drive power is supplied from the battery 6 to the second motor-generator 3.

In HV low mode, remainder of torque output from the engine 1 is transmitted through the first ring gear 12 and the second carrier 24 (second carrier 24 rotating integrally with the second sun gear 21 and second ring gear 22) to the output shaft 27. Rotational speed of the output shaft 27 at this time is equal to rotational speed of the second carrier 24. Torque transmitted to the output shaft 27 is transmitted through the locked one-way clutch 50 to the output gear 51, and transmitted to the axles 57 together with torque output from the second motor-generator 3. This enables high-torque vehicle running using torque from the engine 1 and second motor-generator 3, while maintaining sufficient battery residual charge with power generated by the first motor-generator 2.

Figure 7:
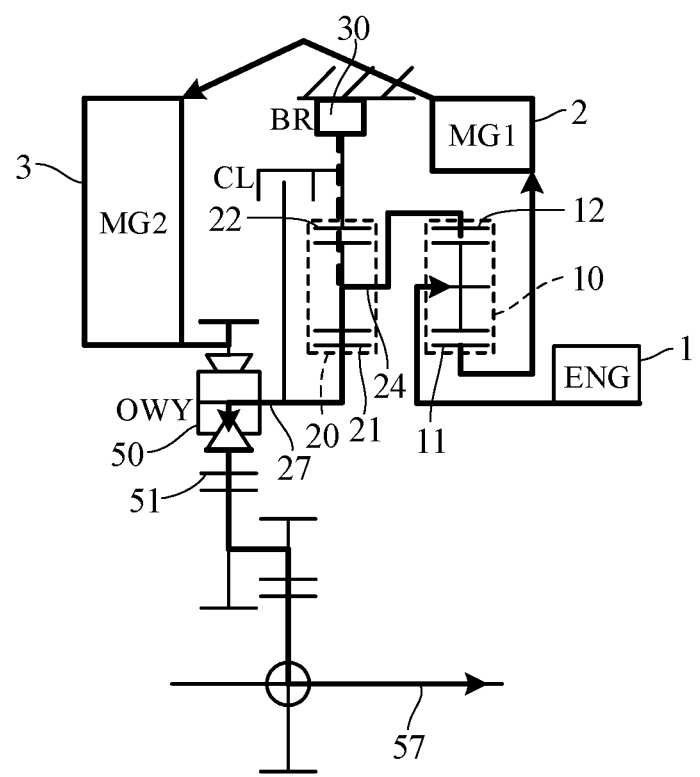
FIG. 7 is a skeleton diagram showing a flow of torque transmission in HV high mode in the drive apparatus of FIG. 1.

FIG. 7 is a skeleton diagram showing flow of torque transmission in HV high mode. As shown in FIG. 7, in HV high mode, similarly to in HV low mode, some torque output from the engine 1, for example, is transmitted through the first sun gear 11 to the first motor-generator 2. Remainder of torque output from the engine 1 is transmitted through the first ring gear 12, second carrier 24 and second sun gear 21 to the output shaft 27. Rotational speed of the output shaft 27 at this time is greater than rotational speed of the second carrier 24.

Torque transmitted to the output shaft 27 is transmitted through the locked one-way clutch 50 to the output gear 51, and transmitted to the axles 57 together with torque output from the second motor-generator 3. Therefore, by utilizing torque from the engine 1 and second motor-generator 3 while maintaining sufficient battery residual charge, vehicle running can be achieved at torque that, while lower than that in HV low mode, is higher than that in EV mode. Since rotation of the output shaft 27 is speeded up by the second planetary gear mechanism 20 in HV high mode, running at lower engine speed than in HV low mode can be realized.

Figure 8A:
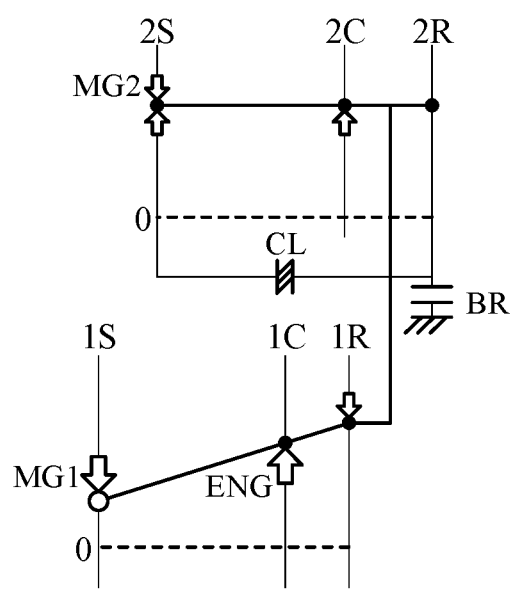
FIG. 8A is an alignment chart showing an example of operation in HV low mode.
Figure 8B:
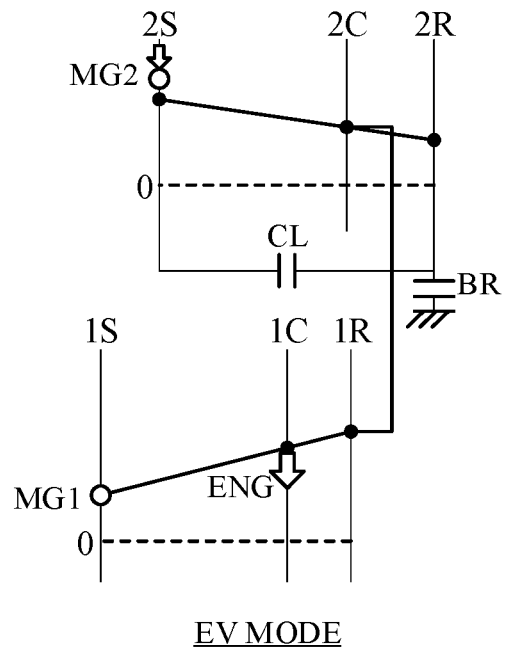
FIG. 8B is an alignment chart showing an example of operation in EV mode.
Figure 8C:
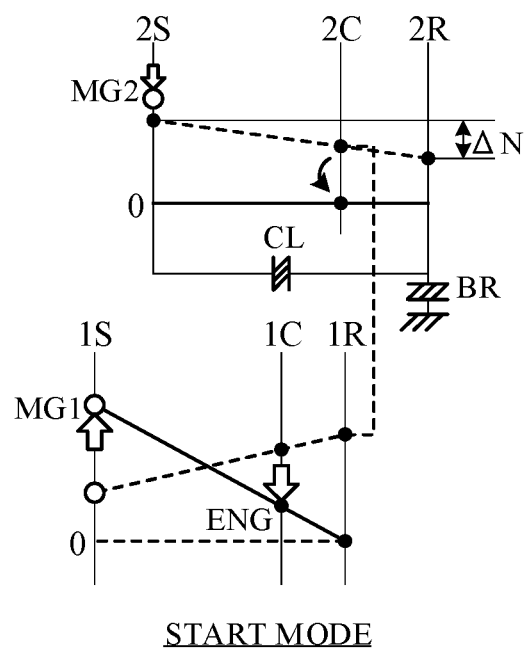
FIG. 8C is an alignment chart showing an example of operation in start mode.

The drive modes further includes a regeneration mode for generating a regenerative energy by the second motor-generator 3 and a start mode for starting the engine 1 in addition to the drive modes shown in FIG. 2. FIGS. 8A to 8C are diagrams each showing an example of an alignment chart corresponding to an operation during a process from HV low mode to start mode through EV mode. In the drawings, the first sun gear 11, first carrier 14 and first ring gear 12 are designated 1S, 1C and 1R, respectively, and the second sun gear 21, second carrier 24 and second ring gear 22 are designated 2S, 2C and 2R, respectively. Rotation direction of the first ring gear 12 and second carrier 24 during forward vehicle movement is defined as positive direction. Forward direction is indicated by symbol "+" and torque acting in forward direction is indicated by upward pointing arrow. FIGS. 8B and 8C are diagrams each showing an alignment chart as a comparative example of the present embodiment. The alignment chart similar to that in FIG. 8B is obtained in also regeneration mode.

For example, as shown in FIG. 8A, when the controller 4 selects HV low mode in response to increase of required driving force owing to increased accelerator pedal depression, the brake mechanism 30 (BR) is turned OFF (released) and the clutch mechanism 40 (CL) is turned ON (engaged). In this state, the first carrier 14 (IC) is rotated in positive direction by the engine 1, the first motor-generator 2 (MG1) is rotationally driven to generate electricity, and the first ring gear 12 (1R) rotates in positive direction owing to reaction force acting on the first ring gear 12. Since the second carrier 24 (2C), second sun gear 21 (2S) and second ring gear 22 (2R) are integral at this time, the second sun gear 21 (2S) rotates at same speed as the second carrier 24 (2C) and the vehicle is traveled by this rotational torque and torque of the second motor-generator 3 (MG2).

When, for example, the controller 4 thereafter selects EV mode in response to decreased depression of the accelerator pedal, both the brake mechanism 30 (BR) and the clutch mechanism 40 (CL) are turned OFF, as indicated in FIG. 8B. In EV mode, rotational speed of the engine 1 decreases owing to stopping of the engine 1 and rotational speeds of the second carrier 24 (2C) and the second ring gear 22 (2R) decrease under the effects of inertia and friction. In addition, rotational speed of the second sun gear 21 (2S) is lowered to below rotational speed of the second motor-generator 3 (MG2) by action of the one-way clutch 50. Amount of rotational speed decrease in this case is, for example, usually greater for the second ring gear 22 (2R) than for the second sun gear 21 (2S), whereby rotational speed of the second ring gear 22 (2R) comes to fall below rotational speed of the second sun gear 21 (2S). But cases also arise in which rotational speed decrease of the second sun gear 21 (2S) is greater than that of the second ring gear 22 (2R).

Should an increase in accelerator depression cause the controller 4 to select HV low mode while in this condition, drive mode transitions to HV low mode after the engine 1 is started in start mode. In start mode, as indicated in FIG. 8C, the second motor-generator 3 (MG2) is kept rotationally driven in positive direction while the brake mechanism 30 (BR) and clutch mechanism 40 (CL) are both turned ON and rotation of the second sun gear 21 (2S), second ring gear 22 (2R), second carrier 24 (2C) and first ring gear 12 (1R) are inhibited. In this state, the first motor-generator 2 (MG1) is rotationally driven in positive direction. As a result, the output shaft 1a of the engine 1 is rotated via the first carrier 14 (1C), thereby starting the engine 1.

In the aforesaid start mode, so long as the brake mechanism 30 and clutch mechanism 40 are ON, rotation of the second sun gear 21 and second ring gear 22 is inhibited while absorbing differential rotation between the second sun gear 21 and second ring gear 22. Therefore, in a case where the rotor that rotates integrally with the second sun gear 21 and the rotor that rotates integrally with the second ring gear 22 are installed axially adjacent, the rotors are apt to frictionally slide against each other and generate friction heat exceeding allowable level. This point is discussed in the following.

Figure 9:
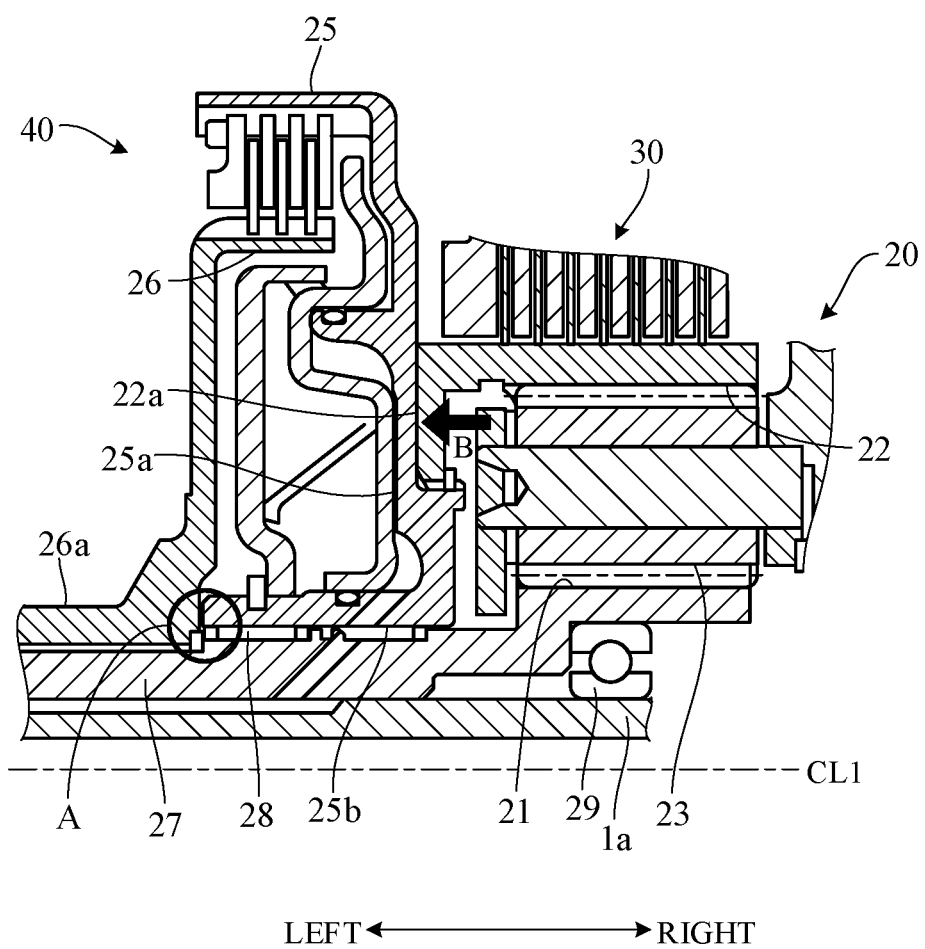
FIG. 9 is a cross-sectional diagram showing main components of the drive apparatus of the hybrid vehicle according to the embodiment of the invention.

FIG. 9 is a cross-sectional diagram showing main components of the drive apparatus 100 in accordance with an embodiment of the present invention, with focus primarily on structural features around the second planetary gear mechanism 20. In the explanation that follows, let direction along the axis CL1 be defined as lateral (left-right) direction. Based on this definition, the first motor-generator 2 is disposed rightward of the second motor-generator 3.

As shown in FIG. 9, the second ring gear 22 has a radially extending sidewall 22a at its left end portion and this sidewall 22a is rotatably coupled integrally to a radially extending sidewall 25a of an outer drum 25 through inner radial end splines of the sidewall 22a. A shaft 25b of the outer drum 25 connected to inner radial end of the sidewall 25a is fitted on outer peripheral surface of an output shaft 27 extending leftward from the second sun gear 21 through a roller bearing 28 to be rotatable and axially movable relative to the output shaft 27. The output shaft 27 is supported through a ball bearing 29 on radially outside of the output shaft 1a of the engine 1 to be rotatable relative to the output shaft 1a. A shaft 26a of an inner drum 26 is installed leftward of the shaft 25b of the outer drum 25. The shaft 26a is coupled through splines to outer peripheral surface of the output shaft 27 to be integrally rotatable with the output shaft 27. Axial position of the shaft 26a relative to the output shaft 27 is restricted by a shim and a snap ring installed on end portion of the shaft 26a.

Thus in the present embodiment the shaft 25b of the outer drum 25 that rotates integrally with the second ring gear 22 is located axially adjacent to the shaft 26a of the inner drum 26 that rotates integrally with the second sun gear 21. Moreover, unlike the shaft 26a whose axial position relative to the output shaft 27 that rotates integrally with the second sun gear 21 is restricted, the shaft 25b is arranged to be axially movable relative to the output shaft 27.

A point requiring attention here is that in the present embodiment the gears 11 to 13 of the first planetary gear mechanism 10 and the gears 21 to 23 of the second planetary gear mechanism 20 are all configured as helical gears. A helical gear exerts axial load during rotation. In the present embodiment, the helical gears are configured so as to generate load acting axially rightward through the planetary gear mechanisms 10 and 20 onto the second ring gear 22 when the planetary gear mechanisms 10 and 20 are driven by the engine 1. When traveling in HV mode (e.g., HV low mode), therefore, the shaft 25b integral with the second ring gear 22 is pushed rightward so that left end surface of the shaft 25b at location indicated by arrow A in FIG. 9 separates from right end surface of the shaft 26a.

On the other hand, in start mode following EV mode, the first motor-generator 2 drives the engine 1 through the first planetary gear mechanism 10 (first sun gear 11 and first carrier 14). Therefore, as indicated by arrow B in FIG. 9, load from the second ring gear 22 acts axially leftward through the planetary gear mechanisms 10 and 20 onto the outer drum 25. As a result, the shaft 25b is pushed leftward so that its left end surface abuts on right end surface of the shaft 26a. Therefore, as shown in FIG. 8C, when differential rotation (differential rotational speed ΔN) occurs between the second sun gear 21 and the second ring gear 22 in start mode, end surfaces of the shafts 25b and 26a slide on each other and are apt to generate greater than a predetermined level of friction heat in region A. In other words, during transition to start mode from EV mode or regeneration mode, in which the engine 1 is stopped, there is a risk of machine damage caused by frictional sliding between the shafts 25b and 26a. So in the present embodiment the drive apparatus 100 is configured as set out in the following in order to prevent generation of heat by sliding friction in start mode.

Figure 10:
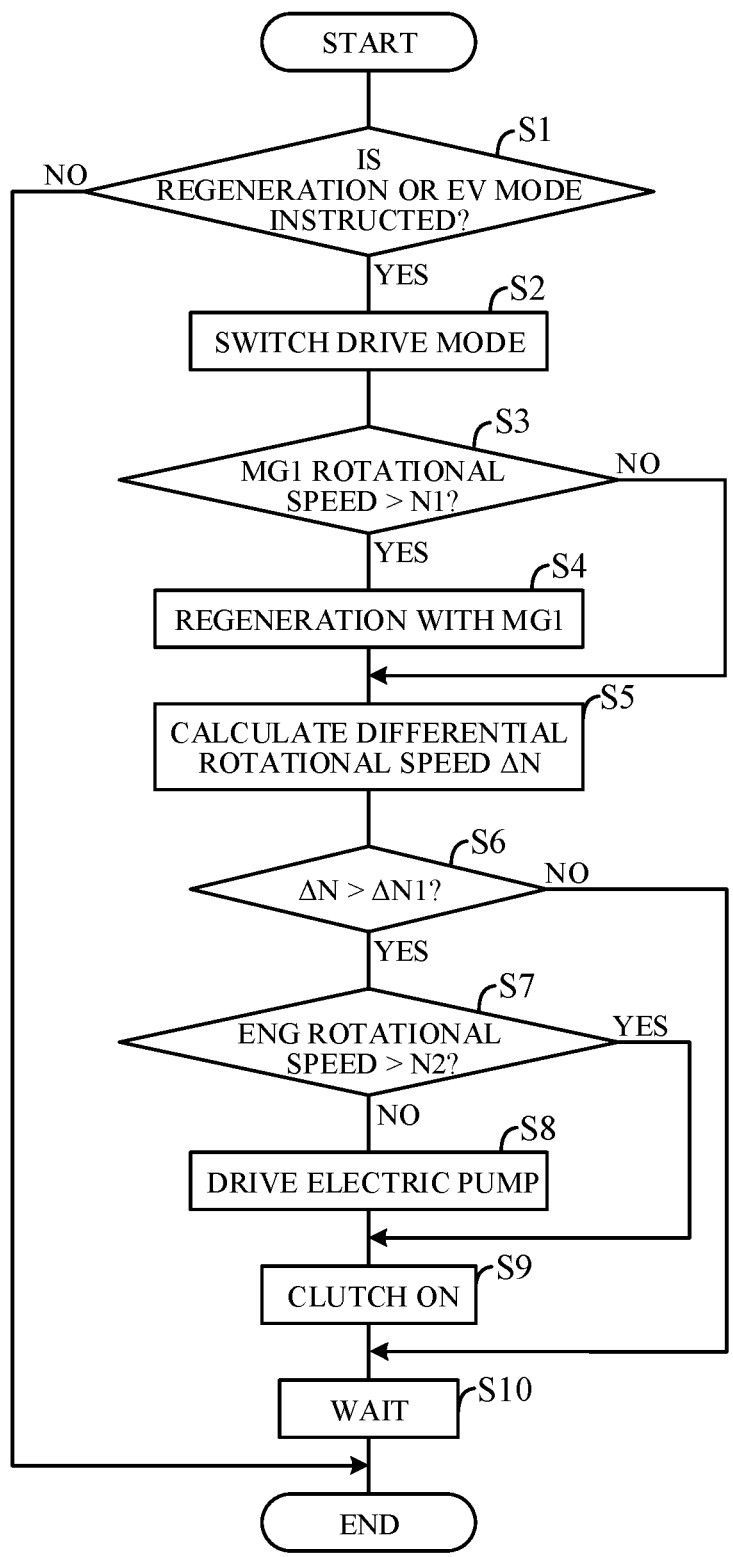
FIG. 10 is a flowchart illustrating an example of processing performed by an ECU in FIG. 1.

FIG. 10 is a flowchart illustrating an example of processing performed by the controller 4 of the drive apparatus 100 according to an embodiment of the present invention (FIG. 1). The processing shown in this flowchart is started when, for example, HV mode (either HV low mode or HV high mode) is selected and is thereafter repeatedly performed at predetermined intervals. In the following, the processing is explained for the case of HV low mode being selected as the HV mode.

First, in S1 (S: processing Step), signals from the vehicle speed sensor 36 and the accelerator opening angle sensor 37 are used to determine whether one or the other of regeneration mode and EV mode is instructed. Optionally, whether one or the other of regeneration mode and EV mode is instructed can be decided by determining whether accelerator pedal depression is equal to or less than a predetermined value (e.g., 0). When the result in S1 is YES, the program goes to S2, and when NO, processing is terminated.

In S2, drive mode is switched to the one of regeneration mode and EV mode determined in S1 to be instructed. In this case, engine drive is terminated by stopping injector fuel injection of the engine 1 and electric power generation by the first motor-generator 2 is temporarily discontinued. Optionally, however, power generation by the first motor-generator 2 can be continued. When drive mode is switched to regeneration mode in S2, regenerative energy is obtained with the second motor-generator 3.

Next, in S3, a signal from the rotational speed sensor 39 is used to determine whether rotational speed of the first motor-generator 2 (MG1 rotational speed) is greater than predetermined value N1 (e.g., 0). This determination amounts to determining whether regenerative energy can be obtained with the first motor-generator 2. Should MG1 rotational speed be negative, energy regeneration is determined to be impossible. When the result in S3 is YES, the program goes to S4, and when NO, skips S4 and goes to S5.

In S4, regeneration is performed with the first motor-generator 2 and MG1 rotational speed is lowered to predetermined rotational speed (e.g., 0 or near 0). As indicated by the alignment chart of the drive apparatus 100 according to the present embodiment shown as an example in FIG. 11A, this increases rotational speed of the first ring gear 12 (1R) around the first carrier 14 (1C) as pivot point. The reason for this is that the output shaft 1a (crankshaft) of the engine 1 is connected to a flywheel so that moment of inertia of the output shaft 1a (crankshaft) is greater than that of the first ring gear 12 (1R). As a result, rotational speed of the first carrier 14 (1C) integral with the output shaft 1a does not easily change and rotational speed of the first ring gear 12 (1R) around the first carrier 14 as pivot point increases. Rotational speed of the second carrier 24 (2C) therefore increases, which in turn also leads to increased rotational speed of, for example, the second ring gear 22 (2R). This decreases differential rotational speed ΔN between the second sun gear 21 (2S) and the second ring gear 22 (2R).

Next, in S5, signals from the rotational speed sensor 35 that detects rotational speed of the outer drum 25, the rotational speed sensor 38 that detects rotational speed of the engine 1 and the rotational speed sensor 39 that detects rotational speed of the first motor-generator 2 are used to calculate differential rotational speed ΔN between the second sun gear 21 and the second ring gear 22. Next, in S6, whether calculated differential rotational speed ΔN is greater than predetermined value ΔN1 is determined. Predetermined value ΔN1 is determined in advance, empirically for example, to correspond to a differential rotation speed at which friction heat caused by sliding between the adjacent shafts 25b and 26a is kept to or below allowable level. When the result in S6 is YES, the program goes to S7, and when NO, skips S7 to S9, and goes to S10.

In S7, a signal from the rotational speed sensor 38 is used to determine whether rotational speed of the engine 1 (ENG rotational speed) is greater than predetermined value N2.

Predetermined value N2 is determined in advance, empirically for example, to correspond to minimum rotational speed of the oil pump 61 enabling discharge of engaging pressure oil required for engaging the clutch mechanism 40. When the result in S7 is NO, the program goes to S8, and when YES, skips S8 and goes to S9.

In S8, a control signal is output for driving the electric pump 62 to deliver engaging pressure oil required for engaging the clutch mechanism 40. Next, in S9, a control signal is output to a control valve of the hydraulic pressure control unit 8 in order to deliver discharge oil from the oil pump 61 or the electric pump 62 to the piston of the clutch mechanism 40. This engages (turns ON) the clutch mechanism 40. Therefore, as indicated by the alignment chart of the drive apparatus 100 according to the present embodiment shown as an example in FIG. 11B, differential rotational speed $\Delta N$ between the second sun gear 21 (2S) and the second ring gear 22 (2R) falls to or below predetermined value $\Delta N1$.

Next, in S10, processing is suspended until restarting of the engine 1 is instructed, namely, is made to stand by until a start mode flag rises. Although not indicated in the drawings, a start flag rises from the state of S10 when, for example, switching to HV low mode is instructed based on signals from the vehicle speed sensor 36 and the accelerator opening angle sensor 37. As a result, the engine 1 is started by simultaneous engagement of the brake mechanism 30 and clutch mechanism 40 and rotation of the output shaft 1a of the engine 1 by the first motor-generator 2.

Although the processing explained in the foregoing is for the case of HV low mode being selected as HV mode, processing similar to that of FIG. 10 is also performed when HV high mode is selected as HV mode. Namely, in the case where HV high mode is switched to regeneration or EV mode, the first motor-generator 2 performs regeneration when MG rotational speed is greater than predetermined value N1 (S4). Therefore, as indicated by the alignment chart after switching from HV high mode to regeneration or EV mode shown as an example in FIG. 12A, this increases rotational speed of the first ring gear 12 (1R) around the first carrier 14 (1C) as pivot point, thereby reducing differential rotational speed $\Delta N$ between the second sun gear 21 (2S) and the second ring gear 22 (2R) (broken line→solid line).

Figure 12A:
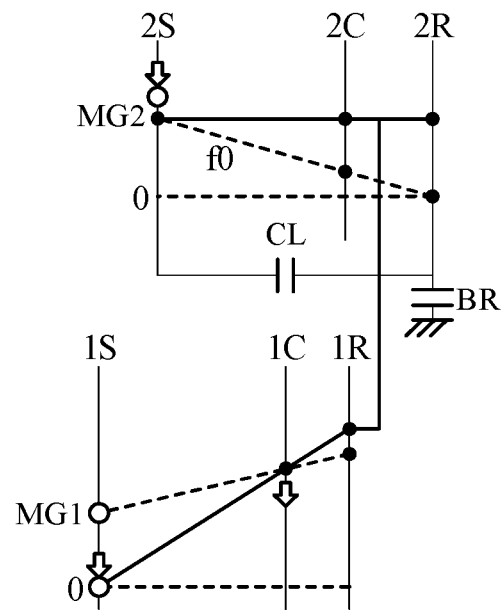
FIG. 12A is an alignment chart showing an example of an operation when switching from HV high mode to regeneration or EV mode in the drive apparatus of the hybrid vehicle according to the embodiment of the invention.
Figure 12B:
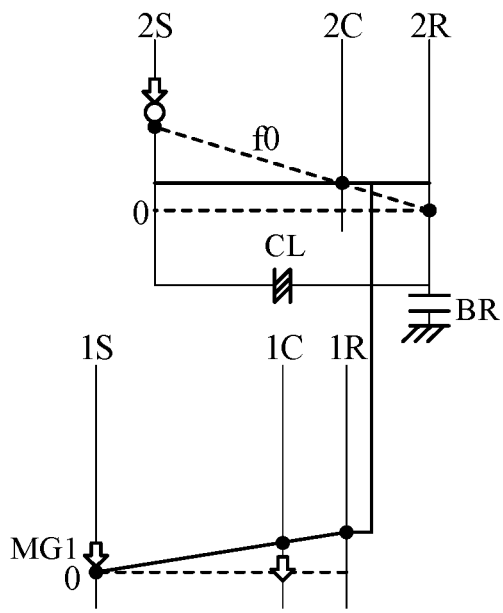
FIG. 12B is an alignment chart showing an modification of FIG. 12A.

Moreover, in the case where HV high mode is switched to regeneration or EV mode, the clutch mechanism 40 is turned ON when differential rotational speed $\Delta N$ between the second sun gear 21 and the second ring gear 22 is greater than predetermined value $\Delta N1$ (S9). Therefore, as indicated in FIG. 12B, differential rotational speed $\Delta N$ between the second sun gear 21 (2S) and the second ring gear 22 (2R) falls to or below predetermined value $\Delta N1$.

Figure 11A:
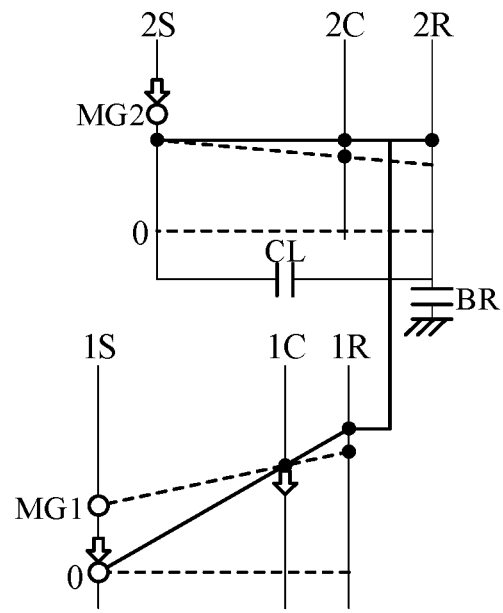
FIG. 11A is an alignment chart showing an example of an operation when switching from HV low mode to regeneration or EV mode in the drive apparatus of the hybrid vehicle according to the embodiment of the invention.

Operation of the present embodiment can be summarized as follows. As shown in FIGS. 11A and 12A, when drive mode switches to EV mode or regeneration mode during traveling in HV low mode or HV high mode, regeneration is performed with the first motor-generator 2, thereby reducing rotational speed of the first sun gear 11 (S4). As this increases rotational speed of the first ring gear 12 around the first carrier 14 as pivot point, differential rotational speed $\Delta N$ between the second sun gear 21 and the second ring gear 22 decreases. When the engine start flag rises while in this state, the engine 1 is rotated by the first motor-generator 2 but frictional sliding between the outer drum 25 and the inner drum 26 (in region A of FIG. 9) is minimized because differential rotational speed $\Delta N$ is small.

Figure 11B:
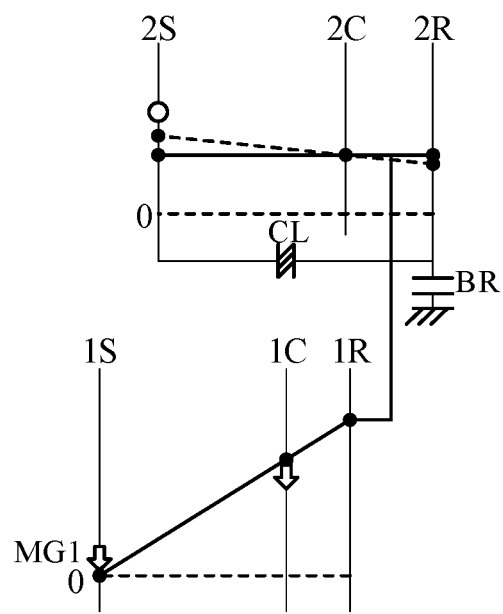
FIG. 11B is an alignment chart showing an modification of FIG. 11A.

At the time drive mode switches to EV mode or regeneration mode during traveling in HV low mode or HV high mode, if rotational speed of the first motor-generator 2 is at or below 0, impossibility of regeneration with the first motor-generator 2 prevents differential rotational speed $\Delta N$ from falling below predetermined value $\Delta N1$. Moreover, even when the first motor-generator 2 performs regeneration, cases arises in which differential rotational speed $\Delta N$ nevertheless fails to fall below predetermined value $\Delta N1$. In such a case, as indicated in FIGS. 11B and 12B, the clutch mechanism 40 turns ON (S9). As differential rotational speed $\Delta N$ can therefore be lowered to or below predetermined value $\Delta N1$, generation of greater than a predetermined level of friction heat at contact region between the outer drum 25 and the inner drum 26 can be reliably prevented. When engine speed is equal to or greater than predetermined value N2 in this case, the electric pump 62 is not driven and the clutch mechanism 40 is engaged by discharge oil from the oil pump 61 (S7→S9). Electric power consumption can therefore be saved.

The present embodiment can achieve advantages and effects such as the following:

(1) The drive apparatus 100 of the hybrid vehicle includes: the engine 1 as its internal combustion engine; the first motor-generator 2; the first planetary gear mechanism 10 including the helical gears and connected to the engine 1 and the first motor-generator 2; the outer drum 25 integral with the second ring gear 22 to receive input of torque output from the first planetary gear mechanism 10 through the second carrier 24; the inner drum 26 integral with the second sun gear 21 and arranged axially adjacent to the outer drum 25 to be capable of rotation relative to the outer drum 25; the clutch mechanism 40 for integrally engaging or disengaging the outer drum 25 and inner drum 26; the output shaft 27, one-way clutch 50 and other components forming the first and second power transmission paths 71 and 72 for transmitting torque output from the inner drum 26 to the drive wheels 101; the second motor-generator 3 connected to the first power transmission path 71; and the controller 4 for selecting drive mode from among multiple drive modes including HV mode using the engine 1 and second motor-generator 3 as drive sources, EV mode adapted to stop the engine 1 and use the second motor-generator 3 as drive source or regeneration mode adapted to stop the engine 1 and perform regeneration with the second motor-generator 3 (these modes being collectively termed "regeneration or EV mode") and start mode for restarting the engine 1, for controlling the engine 1, first motor-generator 2, second motor-generator 3 and engagement of the clutch mechanism 40 in accordance with selected drive mode (FIG. 1). The shaft 25b of the outer drum 25 is axially movably arranged so as to separate from right end portion of the shaft 26a of the inner drum 26 by a load (a first load) acting through the planetary gear mechanisms 10 and 20 toward one axial side (a first direction) at engine-drive time when the engine 1 drives the first planetary gear mechanism 10 and to approach right end portion of the shaft 26a of the inner drum 26 by a load (a second load) acting through the planetary gear mechanisms 10 and 20 toward other axial side (a second direction) at engine-driven time when engine 1 is driven through the first planetary gear mechanism 10 (first sun gear 11 and first carrier 14) (FIG. 9). When drive mode switched from HV mode to regeneration or EV mode, the controller 4 controls the first motor-generator 2 so as to generate regenerative energy, and after that, when drive mode switched to start mode, the controls the first motor-generator 2 and the clutch mechanism 40 so as to engage the clutch mechanism 40 and output drive torque from the first motor-generator 2 (FIG. 10).

This configuration minimizes differential rotational speed $\Delta N$ arising between the second sun gear 21 and the second ring gear 22 when drive mode switches from HV mode to regeneration or EV mode. A structure can therefore be realized that inhibits heat generation by friction between the shaft 25b of the outer drum 25 and the shaft 26a of the inner drum 26 when an axial load on the inner drum 26 side acts on the outer drum 25 through the first planetary gear mechanism 10 in start mode. As this eliminates need to provide axial bearings or other additional components between the shaft 25b and shaft 26a for the purpose of avoiding frictional sliding between the shafts 25b and 26a, it helps to minimize parts count. Moreover, the lack of a need for axial bearing(s) between the shafts 25b and 26a prevents elongation of the drive apparatus 100 in axial direction. In addition, the reduction of heat generation between the shafts 25b and 26a facilitates adjustment of clearance between the shafts 25b and 26a by means of shims.

(2) The drive apparatus 100 of the hybrid vehicle further includes the rotational speed sensors 35, 38 and 39 used to detect rotational speed difference (differential rotational speed $\Delta N$) between the second ring gear 22 (outer drum 25) and the second sun gear 21 (inner drum 26) (FIG. 1). When the differential rotational speed $\Delta N$ detected using signals from the rotational speed sensors 35, 38 and 39 is greater than predetermined value $\Delta N1$ at switching from HV mode to regeneration or EV mode, the controller 4 engages the clutch mechanism 40 (FIG. 10). Differential rotational speed $\Delta N$ can therefore be reliably held at or below predetermined value $\Delta N1$ in regeneration or EV mode even when differential rotational speed $\Delta N$ becomes greater than predetermined value $\Delta N1$ because regeneration cannot be performed with the first motor-generator 2 or when regeneration can be performed but differential rotational speed $\Delta N$ nevertheless fails to fall to or below predetermined value $\Delta N1$. This ensures minimization of heat generation caused by frictional sliding between the shafts 25b and 26a.

(3) The drive apparatus 100 of the hybrid vehicle includes: the first planetary gear mechanism 10 including the first sun gear 11 connected to the first motor-generator 2, the first ring gear 12 and the first carrier 14 connected to the engine 1; and the second planetary gear mechanism 20 including the second sun gear 21 provided integrally with the inner drum 26, the second ring gear 22 provided integrally with the outer drum 25, and the second carrier 24 connected to the first ring gear 12 (FIGS. 1 and 9). Owing to this configuration, when drive mode switches from HV mode to regeneration or EV mode, the decrease in differential rotational speed $\Delta N$ between the second sun gear 21 and the second ring gear 22 is accompanied by a simultaneous decrease in differential rotational speed between the shaft 25b of the outer drum 25 and the shaft 26a of the inner drum 26, thus enabling reduction of heat generation by frictional sliding between the shafts 25b and 26a.

(4) The drive apparatus 100 of the hybrid vehicle additionally includes the brake mechanism 30 for braking and releasing the second ring gear 22 (FIG. 1). The controller 4 additionally controls engagement of the brake mechanism 30 in accordance with selected drive mode. This enables switching among various drive modes including HV low mode and HV high mode.

Various modifications of the aforesaid embodiment are possible. Some examples are explained in the following. In the aforesaid embodiment, the outer drum 25 rotating integrally with the second ring gear 22 of the second planetary gear mechanism 20 is configured as a first rotor, and the inner drum 26 rotating integrally with the second sun gear 21 of the second planetary gear mechanism 20 is configured as a second rotor. However, the configurations of the first rotor and the second rotor are not limited to the aforesaid configurations. In other words, as long as the first rotor and the second rotor are arranged adjacent to each other in axial direction and provided so as to be integrally engaged or disengaged with a clutch mechanism, and further the first rotor is arranged movably in the axial direction so as to separate from the second rotor when the internal combustion engine drives and so as to approach the second rotor when the internal combustion engine is driven, the first rotor and the second rotor can be of any configuration.

In the aforesaid embodiment, the controller 4 as an electronic control unit is configured so as to switch drive mode to any one of a plurality of drive modes including HV mode including HV low mode and HV high mode (a first mode), regeneration or EV mode (a second mode) and start mode (a third mode), etc., the drive mode is not limited to the aforesaid modes. For example, a mode generating an engine braking the may be included in the plurality of drive modes. The mode generating the engine braking is included in the first mode because the engine 1 is driven, similar to start mode. Therefore, even when engine braking generates through regeneration or EV mode, the advantageous effect similar to the aforesaid advantageous effect can be obtained.

In the aforesaid embodiment, differential rotational speed $\Delta N$ (rotational speed difference) arising between the outer drum 25 and the inner drum 26 is calculated (detected) based on signals from the rotational speed sensors 35, 38 and 39. However, the configuration of a speed difference detector is not limited to the aforesaid configuration. In the aforesaid embodiment, the first and second power transmission paths 71 and 72 from the speed change mechanism 70 to the drive wheels 101 are generated by the output shaft 27, the one-way clutch 50, and so on. However, the configuration of a component that generates a power transmission path transmitting a torque output from the second rotor to a drive wheel is not limited to the aforesaid configuration. In the aforesaid embodiment, the brake mechanism 30 and the clutch mechanism 40 of multi-plate wet type are used. However, the configurations of a brake mechanism and a clutch mechanism are not limited to the aforesaid configurations. In the aforesaid embodiment, the first planetary gear mechanism 10 and the second planetary gear mechanism 20 are arranged in left-right direction. However, the arrangement of planetary gear mechanisms is not limited to the aforesaid configuration. The present invention can be also applied to a drive apparatus including a single planetary gear mechanism connected to an internal combustion engine and a first motor-generator, The present invention can be configured as a drive method of a hybrid vehicle, including selecting any of a plurality of drive modes and controlling the engine 1, the first motor-generator 2, the second motor-generator 3 and the clutch mechanism 40 in accordance with the selected drive mode. More specifically, the present invention can be configured as a drive method of a hybrid vehicle, including controlling the first motor-generator 2 and the clutch mechanism 40 so that the first motor-generator 2 generates a regenerative energy when the drive mode is switched from the first mode in which the engine 1 drives the planetary gear mechanism 10 to the second mode in which the engine 1 is stopped, and then so that the clutch mechanism 40 is engaged and the first motor-generator 2 generates a drive torque when the drive mode is switched to the third mode in which the engine 1 is driven through the planetary gear mechanism 10.

The aforesaid embodiment can be combined as desired with one or more of the above modifications. The modifications can also be combined with one another.

According to the present invention, it is possible to reduce heat generation by frictional sliding of rotors arranged adjacently in the axial direction, such as when an internal combustion engine is started.

Above, while the present invention has been described with reference to the preferred embodiments thereof, it will be understood, by those skilled in the art, that various changes and modifications may be made thereto without departing from the scope of the appended claims.

What is claimed is:

1. A drive apparatus of a hybrid vehicle, comprising:
an internal combustion engine;
a first motor-generator;
a planetary gear mechanism including helical gears and connected to the internal combustion engine and the first motor-generator;
a first rotor to which a torque output from the planetary gear mechanism is input;
a second rotor arranged rotatably relative to the first motor and adjacent to the first rotor in an axial direction;
a clutch mechanism configured to integrally engage or disengage the first rotor and the second rotor;
a component configured to generate a power transmission path transmitting a torque output from the second rotor to a drive wheel;
a second motor-generator connected to the power transmission path; and
an electronic control unit including a microprocessor configured to perform selecting a drive mode from among a plurality of drive modes and controlling the internal combustion engine, the first motor-generator, the second motor-generator, and the clutch mechanism in accordance with the drive mode, wherein
the plurality of drive modes include a first mode in which the internal combustion engine drives the planetary gear mechanism, a second mode in which the internal combustion engine is stopped, and a third mode in which the internal combustion engine is driven through the planetary gear mechanism,
the first rotor is arranged movably in the axial direction so as to separate from the second rotor by a first load acting through the planetary gear mechanism toward a first direction in the axial direction when the internal combustion engine drives and so as to approach the second rotor by a second load acting through the planetary gear toward a second direction opposite to the first direction when the internal combustion engine is driven, and
the microprocessor is configured to perform
the controlling including controlling the first motor-generator and the clutch mechanism so that the first motor-generator generates a regenerative energy when the drive mode is switched from the first mode to the second mode, and then so that the clutch mechanism is engaged and the first motor-generator generates a drive torque when the drive mode is switched to the third mode.

2. The drive apparatus according to claim 1, wherein
the microprocessor is configured to perform
the controlling including controlling the internal combustion engine and the second motor-generator so that the internal combustion engine drives and the second motor-generator generates a drive torque in the first mode, the internal combustion engine is stopped and the second motor-generator generates the drive torque or a regenerative energy in the second mode, and the internal combustion engine is restarted in the third mode.

3. The drive apparatus according to claim 2, further comprising
a speed difference detector configured to detect a rotational speed difference between a rotational speed of the first rotor and a rotational speed of the second rotor, wherein
the microprocessor is configured to perform
the controlling including controlling the clutch mechanism so that the clutch mechanism is engaged when the rotational speed difference detected by the speed difference detector is greater than a predetermined rotational speed difference at a time of switching from the first mode to the second mode.

4. The drive apparatus according to claim 3, further comprising
an oil pump driven by the internal combustion engine to supply a hydraulic oil so as to engage the clutch mechanism.

5. The drive apparatus according to claim 4, further comprising:
a rotational speed sensor configured to detect a rotational speed of the internal combustion engine; and
an electric pump driven when the rotational speed detected by the rotational speed sensor is less than a predetermined rotational speed to supply the hydraulic oil so as to engage the clutch mechanism.

6. The drive apparatus according to claim 2, wherein
the planetary gear mechanism is a first planetary gear mechanism including a first sun gear connected to the first motor-generator, a first ring gear, and a first carrier connected to the internal combustion engine, and
the drive apparatus further comprises
a second planetary gear mechanism including a second sun gear provided integrally to the second rotor, a second ring gear provided integrally to the first rotor, and a second carrier connected to the first ring gear.

7. The drive apparatus according to claim 6, further comprising
a brake mechanism configured to brake or release the second ring gear, and
the microprocessor is configured to further perform
the controlling including controlling the brake mechanism in accordance with the drive mode.

8. The drive apparatus according to claim 6, wherein
the first rotor includes a first shaft disposed so as to rotate around an axial line,
the second rotor includes a second shaft disposed on a side of the first shaft so as to rotate around the axial line, and
the drive apparatus further comprises:
a rotational shaft provided on an inside of the first rotor and the second rotor in a radial direction so as to integrally rotate with the second shaft around the axial line and connected to the second sun gear; and
a roller bearing interposed between an inner peripheral surface of the first shaft and an outer peripheral surface of the rotational shaft.

9. A drive method of a hybrid vehicle, the hybrid vehicle including: an internal combustion engine; a first motor-generator; a planetary gear mechanism including helical gears and connected to the internal combustion engine and the first motor-generator; a first rotor to which a torque output from the planetary gear mechanism is input; a second rotor arranged rotatably relative to the first motor and adjacent to the first rotor in an axial direction; a clutch mechanism configured to integrally engage or disengage the first rotor and the second rotor; a component configured to generate a power transmission path transmitting a torque output from the second rotor to a drive wheel; and a second motor-generator connected to the power transmission path, the first rotor being arranged movably in the axial direction so as to separate from the second rotor by a first load acting through the planetary gear mechanism toward a first direction in the axial direction when the internal combustion engine drives and so as to approach the second rotor by a second load acting through the planetary gear toward a second direction opposite to the first direction when the internal combustion engine is driven, the drive method comprising:

selecting a drive mode from among a plurality of drive modes including a first mode in which the internal combustion engine drives the planetary gear mechanism, a second mode in which the internal combustion engine is stopped, and a third mode in which the internal combustion engine is driven through the planetary gear mechanism; and controlling the internal combustion engine, the first motor-generator, the second motor-generator, and the clutch mechanism in accordance with the drive mode, wherein the controlling includes controlling the first motor-generator and the clutch mechanism so that the first motor-generator generates a regenerative energy when the drive mode is switched from the first mode to the second mode, and then so that the clutch mechanism is engaged and the first motor-generator generates a drive torque when the drive mode is switched to the third mode.

* * * * *